United States Patent
Xu et al.

(10) Patent No.: US 8,587,965 B2
(45) Date of Patent: Nov. 19, 2013

(54) CURRENT-INPUT-TYPE PARALLEL RESONANT DC/DC CONVERTER AND METHOD THEREOF

(75) Inventors: Ming Xu, Nanjing (CN); Julu Sun, Nanjing (CN)

(73) Assignees: FSP-Powerland Technology Inc., Nanjing (CN); FSP Technology Inc., Taoyuan County (TW)

( * ) Notice: Subject to any disclaimer, the term of this patent is extended or adjusted under 35 U.S.C. 154(b) by 158 days.

(21) Appl. No.: 13/208,348

(22) Filed: Aug. 12, 2011

(65) Prior Publication Data

US 2012/0039092 A1 Feb. 16, 2012

(30) Foreign Application Priority Data

Aug. 13, 2010 (CN) .......................... 2010 1 0253498

(51) Int. Cl.
*H02M 3/335* (2006.01)
(52) U.S. Cl.
USPC ..................................................... 363/21.02
(58) Field of Classification Search
USPC ........... 363/16, 17, 21.02, 21.03, 97, 98, 131, 363/132
See application file for complete search history.

(56) References Cited

U.S. PATENT DOCUMENTS

| | | | | |
|---|---|---|---|---|
| 5,151,852 A | * | 9/1992 | Jacobson et al. | 363/131 |
| 5,157,593 A | * | 10/1992 | Jain | 363/17 |
| 6,560,127 B2 | * | 5/2003 | Wittenbreder, Jr. | 363/17 |
| 2002/0008981 A1 | * | 1/2002 | Jain et al. | 363/132 |
| 2011/0090717 A1 | * | 4/2011 | Lee et al. | 363/21.02 |

* cited by examiner

*Primary Examiner* — Timothy J Dole
*Assistant Examiner* — Ivan Laboy Andino
(74) *Attorney, Agent, or Firm* — Jianq Chyun IP Office

(57) ABSTRACT

A current-input-type parallel resonant DC/DC converter and a method thereof are provided. The converter includes an inverter-circuit for inverting/converting an input DC current into a positive-and-negative alternating square-wave-current, a resonant-network for converting the square-wave-current into a sine-voltage, a transformer for realizing the isolation of the power transmission, a full-wave rectifier-circuit for rectifying the sine-voltage, and an output-filter-circuit for producing a DC output-voltage. The inverter-circuit is connected to both terminals of a primary-winding of the transformer through the resonant-network connected in series with the inverter-circuit, a common-polarity terminal of a first-winding at a secondary side of the transformer and an opposite-polarity terminal of a second-winding at the secondary side of the transformer are respectively connected to an input of the full-wave rectifier-circuit, and an output of the full-wave rectifier-circuit and a center-tap terminal at the secondary side of the transformer are respectively connected to an input of the output-filter-circuit.

10 Claims, 4 Drawing Sheets

US 8,587,965 B2

CURRENT-INPUT-TYPE PARALLEL RESONANT DC/DC CONVERTER AND METHOD THEREOF

CROSS-REFERENCE TO RELATED APPLICATION

This application claims the priority benefit of China application serial no. 201010253498.4, filed on Aug. 13, 2010. The entirety of the above-mentioned patent application is hereby incorporated by reference herein and made a part of this specification.

BACKGROUND OF THE INVENTION

1. Field of the Invention

The invention relates to a resonant DC/DC converting circuit field, and more particularly, to a current-input-type parallel resonant DC/DC converter and a method thereof.

2. Description of Related Art

An LLC resonant DC/DC converter is widely applied in many power supplies, such as laptop adaptor, due to the simplicity and high efficiency thereof. However, some problems thereof still limit or block the applications thereof in some fields, for example, in the application of telecom and server power. The above-mentioned problems include reliable driving of synchronous rectifier (SR), large current ripple on output capacitor and current-limiting operation for multi-parallel running In order to solve the above-mentioned problems, IC chip solution providers and power device manufacturers have put a lot of resources thereinto. So far however, the relevant manufacturers still rely on "smart driver IC" to solve the SR driving problem and the reliable operation problem under a dynamical work condition remains even now as formerly.

SUMMARY OF THE INVENTION

Accordingly, the invention is directed to a current-input-type parallel resonant DC/DC converter and a method thereof aimed at the currently present faults.

To achieve the above-mentioned objectives, the invention provides a following technical scheme.

The invention provides a current-input-type parallel resonant DC/DC converter, which includes an inverter circuit, a resonant network, a transformer, a full-wave rectifier circuit and an output filter circuit. The inverter circuit is connected to both terminals of a primary side of the transformer through the resonant network connected in series with the inverter circuit, a common-polarity terminal of a first winding at a secondary side of the transformer and an opposite-polarity terminal of a second winding at the secondary side of the transformer are respectively connected to an input of the full-wave rectifier circuit, and an output of the full-wave rectifier circuit and a center-tap terminal at the secondary side of the transformer are respectively connected to an input of the output filter circuit. The inverter circuit is used for inverting/converting an input DC signal into a positive and negative alternating square wave current. The resonant network is used for converting the positive and negative alternating square wave current into a sine-voltage. The transformer is used for realizing an isolation of power transmission. The full-wave rectifier circuit is used for rectifying the sine-voltage. The output filter circuit is used for producing a DC output-voltage.

The invention also provides a current-input-type parallel resonant DC/DC converting method, and which includes adopting an inverter circuit to invert an input DC signal into a positive and negative alternating square wave current; adopting a resonant network to convert the square wave current into a sine voltage; adopting a transformer to realize the isolation of the power transmission; and rectifying the sine voltage by a full-wave rectifier circuit, and then producing a DC output voltage through an output filter circuit.

In the invention, since voltages of primary-side switching transistors in the inverter circuit and secondary-side diodes (or SR) in the full-wave rectifier circuit are sine half-wave, so that the EMI performance of the DC/DC circuit is significantly improved. Meanwhile, due to introducing the output filter inductor, the ripple current of the output filter capacitor is also largely reduced. In addition, the synchronous rectifier (SR) at the secondary side can be driven by using a PWM driving signal at the primary side without the scheme of such as a "smart driver IC" where the turning on/off operations of an SR is decided by testing the SR current. As a result, the invention avoids wrong driving problem under special work condition.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
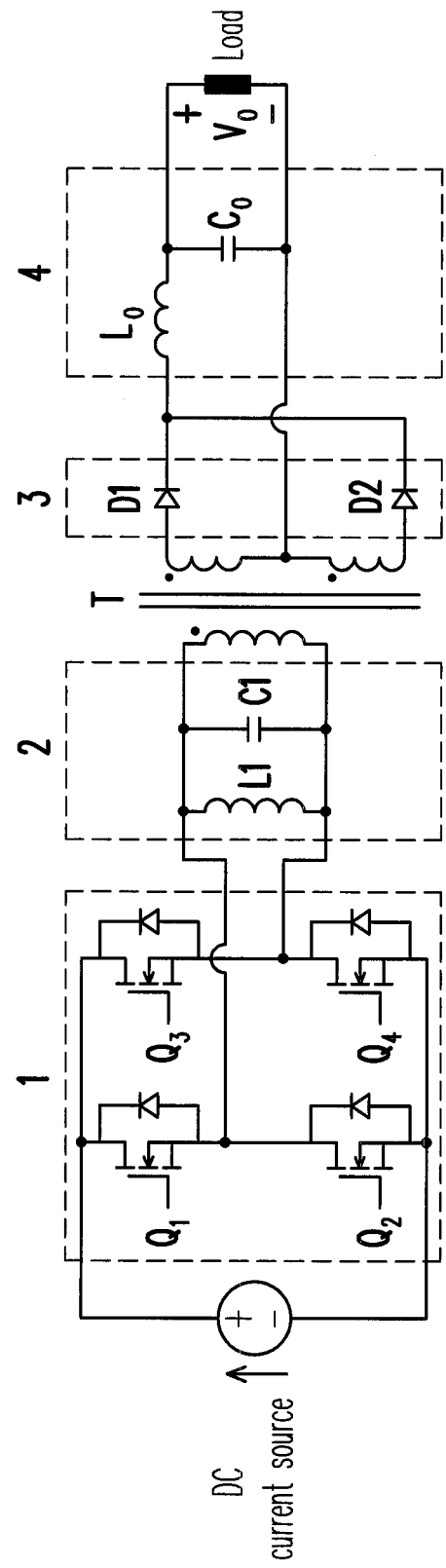
FIG. 1 is a schematic diagram according to one embodiment of the invention.

As shown by FIG. 1, a current-input-type parallel resonant DC/DC converter includes an inverter circuit (1), a resonant network (2), a transformer (T), a full-wave rectifier circuit (3) and an output filter circuit (4), in which the inverter circuit (1) is connected to both terminals of a primary side of the transformer (T) through the resonant network (2) connected in series with the inverter circuit (1), a common-polarity terminal of a first winding at a secondary side of the transformer (T) and an opposite-polarity terminal of a second winding at the secondary side of the transformer (T) are respectively connected to an input of the full-wave rectifier circuit (3), and an output of the full-wave rectifier circuit (3) and a center-tap terminal at the secondary side of the transformer (T) are respectively connected to an input of the output filter circuit (4). The inverter circuit (1) is used for inverting/converting an input DC signal (for example, an input DC current) into a positive and negative alternating square wave current. The resonant network (2) is used for converting the positive and negative alternating square wave current into a sine-voltage. The transformer (T) is used for realizing an isolation of power transmission. The full-wave rectifier circuit (3) is used for rectifying the sine-voltage, such that the full-wave rectifier circuit (3) may be a full-bridge rectifier circuit or a current doubler rectifier circuit, or the like. The output filter circuit (4) is used for producing a DC output-voltage VO.

The output filter circuit (4) includes an output filter inductor LO and an output filter capacitor CO, in which a first terminal of the output filter inductor LO is connected to the output of the full-wave rectifier circuit (3), a second terminal of the output filter inductor LO is connected to a first terminal of the output filter capacitor CO, and a second terminal of the output filter capacitor CO is connected to the center-tap terminal at the secondary side of the transformer (T). The resonant network (2) includes a resonant inductor L1 and a resonant capacitor C1. The resonant capacitor C1 is coupled with the resonant inductor L1 and the both terminals of the primary winding of the transformer (T) in parallel.

The invention also provides a current-input-type parallel resonant DC/DC converting method, which includes: first, adopting the inverter circuit (1) to invert/convert an input DC signal (for example, an input DC current or an input DC voltage) into a positive and negative alternating square wave current; next, adopting the resonant network (2) to convert the square wave current into a sine voltage; then, adopting the transformer (T) to realize the isolation of power transmission; finally, rectifying the sine voltage by the full-wave rectifier circuit (3), and then producing a DC output voltage through the output filter circuit (4).

The input of the inverter circuit (1) is a DC current source. The DC current is inverted/converted into a positive and negative alternating square wave current by alternately turning on/off transistors Q1-Q4 in the inverter circuit (1). Then, the square wave current is used to excite the back-stage resonant network L1-C1, the transformer and a load. Under the operation of the resonant network, the primary side of the transformer (T) produces a sine voltage with a frequency same as the square wave current. After the sine voltage is rectified by the diodes D1 and D2 in the full-wave rectifier circuit (3) and filtered by the output filter inductor LO and the output filter capacitor CO, the DC output voltage VO is produced and provided to the load.

Figure 2:
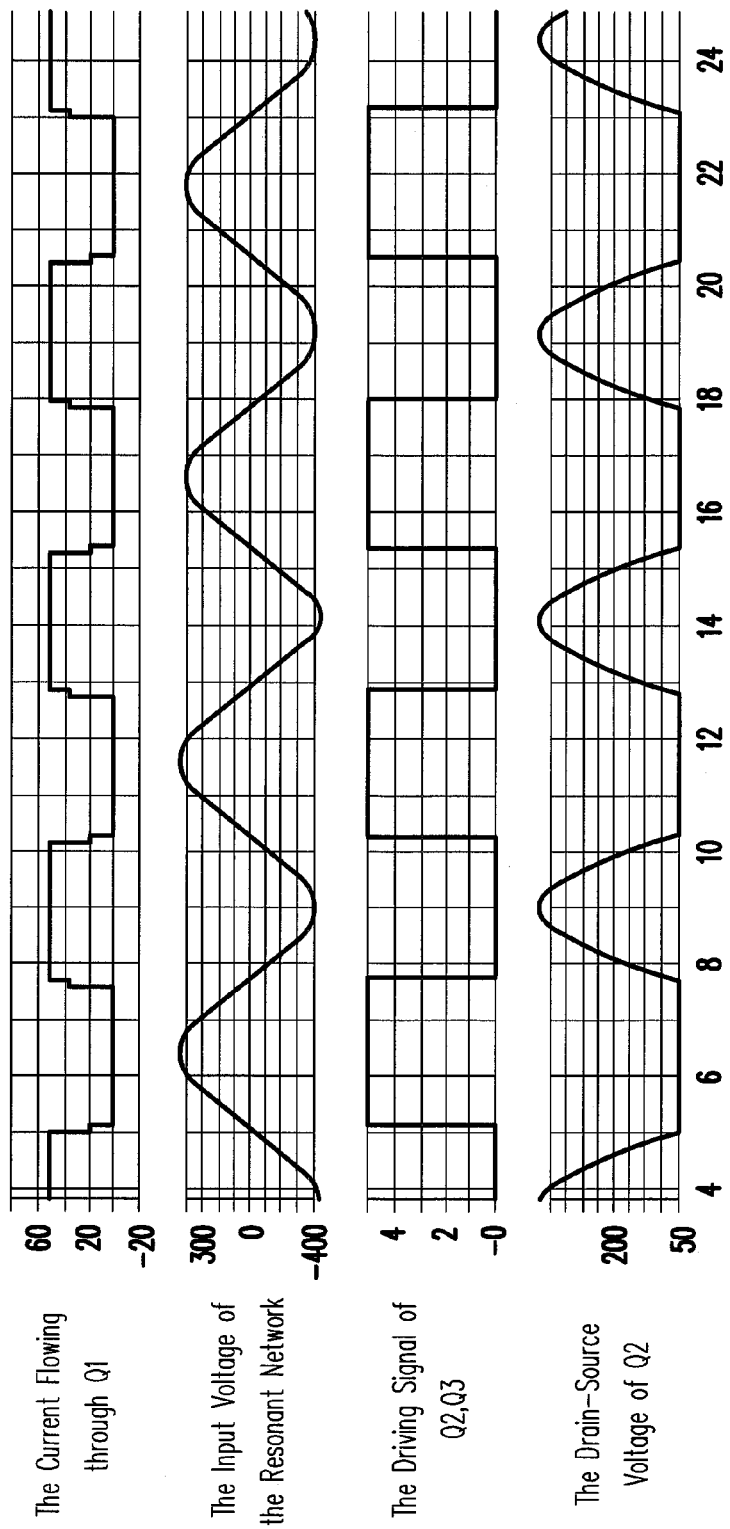
FIG. 2 is simulation waveforms relating to FIG. 1.

As shown by FIG. 2, the switching frequency of the transistors Q1-Q4 is fixed at the resonant frequency point of L1-C1 (i.e. the resonant inductor L1 and the resonant capacitor C1) in the resonant network (2), in which in order to adjust/regulate the output voltage VO, the amplitude of the DC input current source can be adjusted at the previous stage or the inverting output current (i.e., an exciting current of the resonant network(2)) can be controlled into a quasi-square wave current. In this way, the dead time of the quasi-square wave current can be regulated through a duty cycle, so as to control the fundamental component of the quasi-square wave current. FIG. 2 shows simulation waveforms under the condition of 50% duty cycle of the switches (i.e. the transistors Q1-Q4). The driving signal of the transistors Q1 and Q4 can directly drive the diode D1 through isolated transmission, and the driving signal of the transistors Q2 and Q3 can directly drive the diode D2 through isolated transmission.

Figure 3:
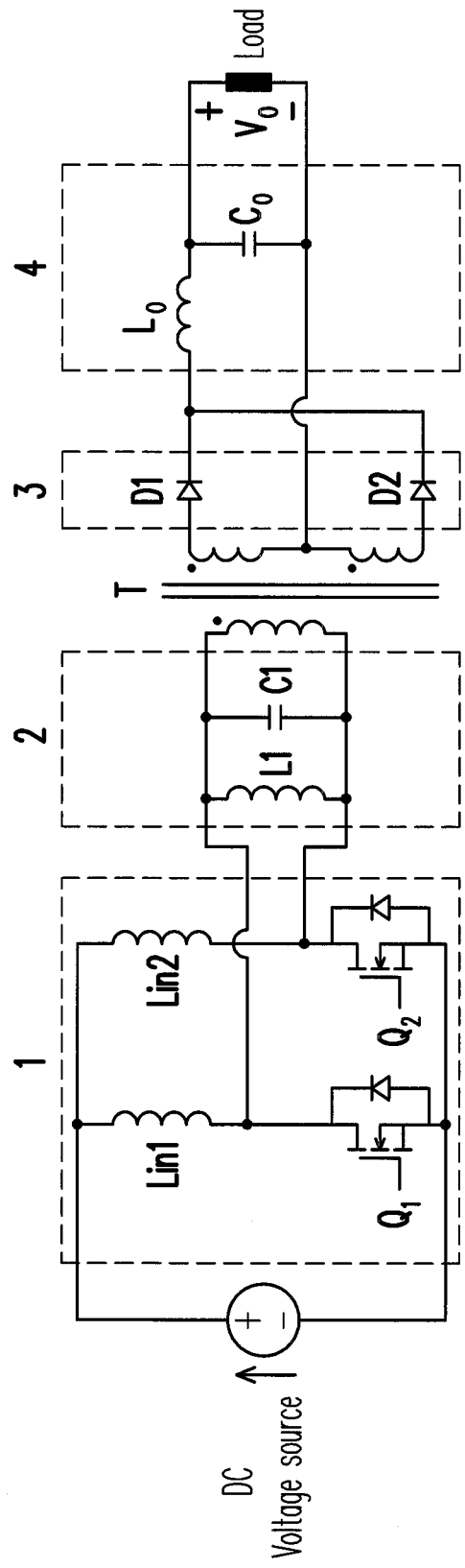
FIG. 3 is a schematic diagram according to another embodiment of the invention.
Figure 4:
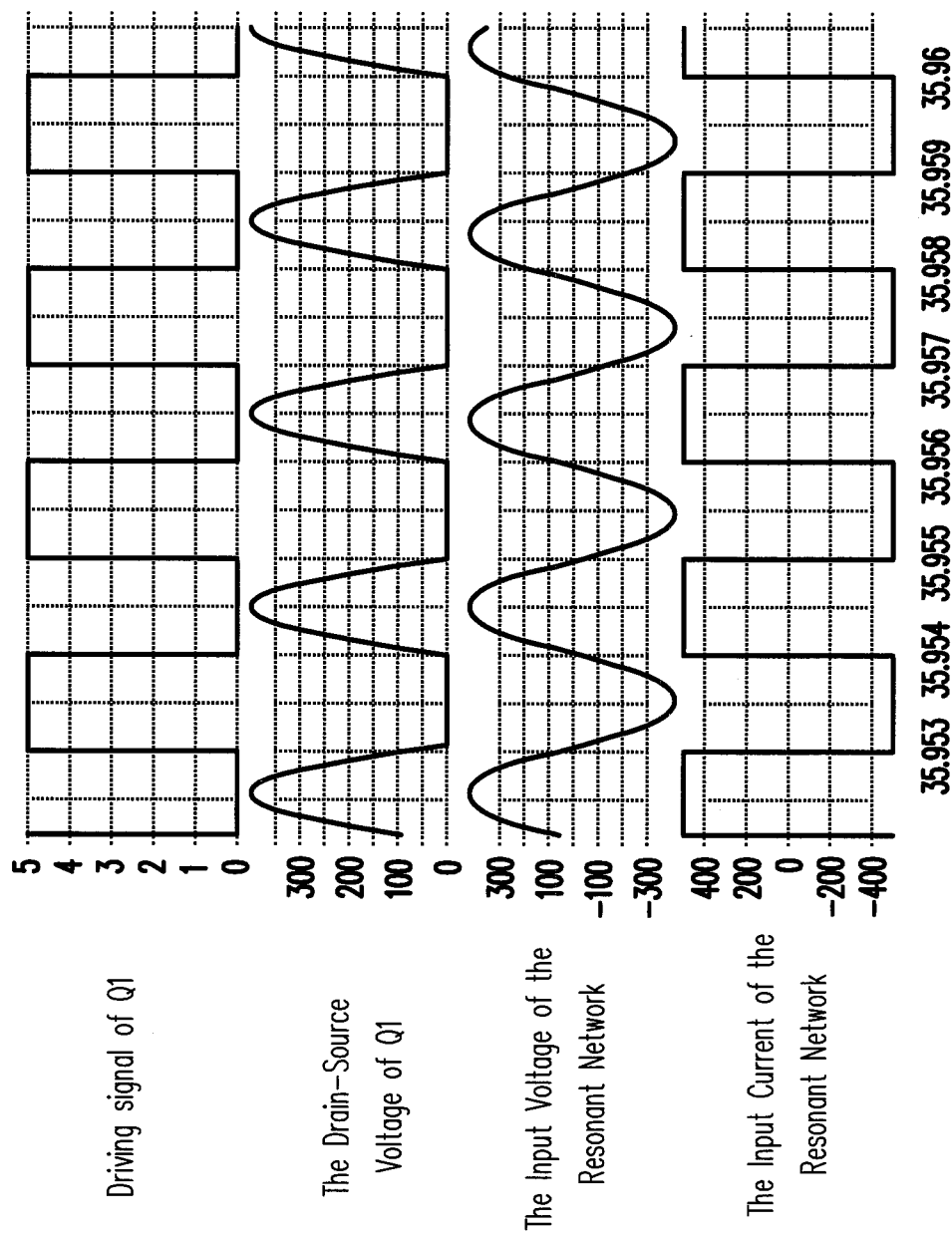
FIG. 4 is simulation waveforms relating to FIG. 3.

In the other hands, FIG. 3 is a schematic diagram according to another embodiment of the invention. Referring to FIGS. 1 and 3, the difference between FIGS. 1 and 3 is that the input of the inverter circuit (1) of FIG. 3 is a DC voltage source. Accordingly, the inverter circuit (1) of FIG. 3 is used for converting the input DC voltage into a positive and negative alternating square wave current, and which includes two inductors Lin1, Lin2 and two switches Q1, Q2. The transistor Q1 is connected in series with the inductor Lin1, and the inductor Lin1 and transistor Q1 serially-connected are connected in parallel with the input DC voltage. The transistor Q2 is connected in series with the inductor Lin2, and the inductor Lin2 and transistor Q2 serially-connected are also connected in parallel with the input DC voltage. In this embodiment, the current flowing through the two inductors Lin1 and Lin2 is nearly constant current under the inductances of Lin1 and Lin2 are designed to be large. Similarly, a switching frequency of the transistors Q1 and Q2 is fixed at a resonant frequency point of the resonant inductor L1 and the resonant capacitor C1 in the resonant network (2). Further, FIG. 4 shows simulation waveforms under the condition of 50% duty cycle of the two switches (i.e. the transistors Q1 and Q2).

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A current-input-type parallel resonant DC/DC converter, comprising:
    an inverter circuit, for converting an input DC signal into a positive and negative alternating square wave current;
    a resonant network, for converting the positive and negative alternating square wave current into a sine-voltage;
    a transformer, for realizing an isolation of power transmission;
    a full-wave rectifier circuit, for rectifying the sine-voltage; and
    an output filter circuit, for producing a DC output-voltage,
    wherein the inverter circuit is connected to both terminals of a primary side of the transformer through the resonant network connected in series with the inverter circuit, a common-polarity terminal of a first winding at a secondary side of the transformer and an opposite-polarity terminal of a second winding at the secondary side of the transformer are respectively connected to an input of the full-wave rectifier circuit, and an output of the full-wave rectifier circuit and a center-tap terminal at the secondary side of the transformer are respectively connected to an input of the output filter circuit,
    wherein the resonant network only comprises:
        a resonant inductor; and
        a resonant capacitor connected with the resonant inductor and the both terminals of the primary winding of the transformer in parallel,
    wherein there is no series inductive element between the inverter circuit and the parallel-connected resonant inductor and capacitor in the resonant network.

2. The current-input-type parallel resonant DC/DC converter as claimed in claim 1, wherein the output filter circuit comprises:
    an output filter inductor; and
    an output filter capacitor,
    wherein a first terminal of the output filter inductor is connected to the output of the full-wave rectifier circuit, a second terminal of the output filter inductor is connected to a first terminal of the output filter capacitor, and a second terminal of the output filter capacitor is connected to the center-tap terminal at the secondary side of the transformer.

3. The current-input type parallel resonant DC/DC converter as claimed in claim 1, wherein when the input DC signal is an input DC current, the inverter circuit comprises:
    a first to a fourth transistors,
    wherein a switching frequency of the first to the fourth transistors is fixed at a resonant frequency point of the resonant inductor and the resonant capacitor in the resonant network.

4. The current-input type parallel resonant DC/DC converter as claimed in claim 1, wherein the input DC signal is an input DC voltage, the inverter circuit comprises:
   a first inductor;
   a first transistor connected in series with the first inductor, wherein the first inductor and first transistor serially-connected are connected in parallel with the input DC voltage;
   a second inductor; and
   a second transistor connected in series with the second inductor, wherein the second inductor and second transistor serially-connected are connected in parallel with the input DC voltage,
   wherein a switching frequency of the first and the second transistors is fixed at a resonant frequency point of the resonant inductor and the resonant capacitor in the resonant network.

5. The current-input type parallel resonant DC/DC converter as claimed in claim 1, wherein a DC output voltage from the output filter circuit is regulated by adjusting an input of the inverter circuit or controlling an exciting current of the resonant network to be a quasi-square wave current.

6. A current-input-type parallel resonant DC/DC converting method, comprising:
   adopting an inverter circuit to invert an input DC signal into a positive and negative alternating square wave current;
   adopting a resonant network to convert the square wave current into a sine voltage, wherein the resonant network only comprises a parallel-connected resonant inductor and capacitor, and there is no series inductive element between the inverter circuit and the parallel-connected resonant inductor and capacitor in the resonant network;
   adopting a transformer to realize the isolation of the power transmission; and
   rectifying the sine voltage by a full-wave rectifier circuit, and then producing a DC output voltage through an output filter circuit.

7. The current-input-type parallel resonant DC/DC converting method as claimed in claim 6, wherein the input DC signal is an input DC current or an input DC voltage.

8. The current-input-type parallel resonant DC/DC converting method as claimed in claim 7, wherein when the input DC signal is the input DC current, the inverter circuit is consisted of a plurality of transistors, and a switching frequency of the transistors is fixed at a resonant frequency point of the resonant network.

9. The current-input-type parallel resonant DC/DC converting method as claimed in claim 7, wherein when the input DC signal is the input DC voltage, the inverter circuit is consisted of several inductors and several transistors, and a switching frequency of the transistors is fixed at a resonant frequency point of the resonant network.

10. The current-input-type parallel resonant DC/DC converting method as claimed in claim 6, wherein the DC output voltage from the output filter circuit is regulated by adjusting the input DC voltage or controlling an exciting current of the resonant network to be a quasi-square wave current.

\* \* \* \* \*